United States Patent
Lee et al.

(10) Patent No.: US 9,535,543 B2
(45) Date of Patent: Jan. 3, 2017

(54) TOUCH PANEL AND METHOD FOR MANUFACTURING THE SAME

(75) Inventors: Dong Youl Lee, Seoul (KR); Yong Jin Lee, Seoul (KR); Young Sun You, Seoul (KR); Kyoung Hoon Chai, Seoul (KR); Young Jin Noh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 347 days.

(21) Appl. No.: 13/810,073

(22) PCT Filed: Jul. 13, 2011

(86) PCT No.: PCT/KR2011/005163
§ 371 (c)(1),
(2), (4) Date: Mar. 25, 2013

(87) PCT Pub. No.: WO2012/008759
PCT Pub. Date: Jan. 19, 2012

(65) Prior Publication Data
US 2013/0181944 A1    Jul. 18, 2013

(30) Foreign Application Priority Data

Jul. 14, 2010  (KR) .................. 10-2010-0067816
Jul. 22, 2010  (KR) .................. 10-2010-0071124

(51) Int. Cl.
*G06F 3/041*  (2006.01)
*G06F 3/044*  (2006.01)

(52) U.S. Cl.
CPC ..................................... *G06F 3/044* (2013.01)

(58) Field of Classification Search
CPC .. G02F 1/133345; G06F 3/044; G06F 3/0412; G06F 1/169; G06F 3/041; G06F 1/1692
(Continued)

(56) References Cited

U.S. PATENT DOCUMENTS 8,018,568 B2 *  9/2011  Allemand .............. B82Y 10/00
                                                    349/187
8,217,902 B2 *  7/2012  Chang ..................... G06F 3/044
                                                    324/661
(Continued)

FOREIGN PATENT DOCUMENTS

CN        201429838 Y      3/2010
CN        201489507 U      5/2010
(Continued)

OTHER PUBLICATIONS

Office Action dated Feb. 3, 2015 in Chinese Application No. 201180034679.0.
(Continued)

*Primary Examiner* — Calvin C Ma
(74) *Attorney, Agent, or Firm* — Saliwanchik, Lloyd & Eisenschenk

(57) ABSTRACT

A touch panel according to the embodiment includes a substrate; a first electrode formed on the substrate in a first direction and including a plurality of sensor parts and connection parts connecting the sensor parts with each other; and a second electrode formed in a second direction crossing the first direction while being insulated from the first electrode and including a plurality of sensor parts and connection parts connecting the sensor parts with each other. The sensor parts and the connection parts include transparent conductive materials, and the connection parts have resistance lower than resistance of the sensor parts in at least one of the first and second electrodes.

14 Claims, 8 Drawing Sheets

(58) Field of Classification Search
USPC .................................. 345/173, 174; 427/97.3
See application file for complete search history.

(56) References Cited

U.S. PATENT DOCUMENTS

| | | | |
|---|---|---|---|
| 2005/0172722 A1* | 8/2005 | Kobayashi | G01L 1/14 73/754 |
| 2008/0264699 A1 | 10/2008 | Chang et al. | |
| 2008/0309635 A1 | 12/2008 | Matsuo | |
| 2009/0160824 A1 | 6/2009 | Chih-Yung et al. | |
| 2009/0262096 A1 | 10/2009 | Teramoto | |
| 2009/0309850 A1 | 12/2009 | Yang et al. | |
| 2009/0315854 A1 | 12/2009 | Matsuo | |
| 2010/0007616 A1 | 1/2010 | Jang | |
| 2010/0013745 A1 | 1/2010 | Kim et al. | |
| 2010/0026661 A1 | 2/2010 | Teramoto | |
| 2010/0078602 A1 | 4/2010 | Hosoya et al. | |
| 2010/0156810 A1* | 6/2010 | Barbier et al. | 345/173 |
| 2010/0157510 A1 | 6/2010 | Miyachi et al. | |
| 2010/0171718 A1 | 7/2010 | Denda | |
| 2010/0289762 A1* | 11/2010 | Ito | C08J 7/042 345/173 |
| 2011/0032196 A1* | 2/2011 | Feng et al. | 345/173 |
| 2011/0096256 A1 | 4/2011 | Nagata et al. | |
| 2011/0157086 A1 | 6/2011 | Ozeki et al. | |

FOREIGN PATENT DOCUMENTS

| | | |
|---|---|---|
| CN | 101763191 A | 6/2010 |
| JP | 2004-196912 A | 7/2004 |
| JP | 3134925 U | 8/2007 |
| JP | 2009-205924 A | 9/2009 |
| JP | 3154829 U | 10/2009 |
| JP | 2009-265748 A | 11/2009 |
| JP | 2010-033478 A | 2/2010 |
| JP | 2010-086714 A | 4/2010 |
| JP | 2010-140370 A | 6/2010 |
| JP | 2010-146283 A | 7/2010 |
| JP | 2010-153454 A | 7/2010 |
| JP | 2010160670 A | 7/2010 |
| JP | 2011-022659 A | 2/2011 |
| JP | 2011-034183 A | 2/2011 |
| JP | 2011-039759 A | 2/2011 |
| JP | 2011-107699 A | 6/2011 |
| JP | 2011180806 A | 9/2011 |
| KR | 1020080063194 A | 7/2008 |
| KR | 10-2008-0110477 A | 12/2008 |
| KR | 10-2009-0058072 A | 6/2009 |
| KR | 10-2009-0131638 A | 12/2009 |
| KR | 10-2010-0007717 A | 1/2010 |
| KR | 10-2010-0010019 A | 1/2010 |
| TW | M378429 U1 | 4/2010 |
| TW | M381834 U1 | 6/2010 |
| TW | M383779 U1 | 7/2010 |
| WO | WO-2010-029979 A | 3/2010 |

OTHER PUBLICATIONS

Office Action dated Feb. 3, 2015 in Japanese Application No. 2013-519591.
International Search Report in International Application No. PCT/KR2011/005163, filed Jul. 13, 2011.
Notice of Allowance dated Dec. 27, 2011 in Korean Application No. 10-2010-0067816, filed Jul. 14, 2010.
Office Action dated Aug. 31, 2011 in Korean Application No. 10-2010-0067816, filed Jul. 14, 2010.
Office Action dated Jan. 14, 2014 in Japanese Application No. 2013-519591.
Office Action dated Jul. 29, 2015 in Chinese Application No. 201180034679.0.
Office Action dated Sep. 15, 2015 in Japanese Application No. 2014-082652.
Japanese Office Action dated Oct. 6, 2015 in Japanese Application No. 2013-519591.
Office Action dated Mar. 22, 2016 in Japanese Patent Application No. 2014-082652.
Office Action dated Dec. 10, 2015 in Taiwanese Application No. 100124904.
European Search Report dated Sep. 7, 2016 in European Application No. 11807044.0.

* cited by examiner (a)

(b)

(a)

(b)

(a)

(b)

(a)

(b)

(a)

(b)

(a)

(b)

(a)

(b)

TOUCH PANEL AND METHOD FOR MANUFACTURING THE SAME

CROSS-REFERENCE TO RELATED APPLICATIONS

This application is the U.S. national stage application of International Patent Application No. PCT/KR2011/005163, filed Jul. 13, 2011, which claims priority to Korean Application Nos. 10-2010-0067816, filed Jul. 14, 2010, and 10-2010-0071124, filed Jul. 22, 2010, the disclosures of each of which are incorporated herein by reference in their entirety.

TECHNICAL FIELD

The disclosure relates to a touch panel and a method for manufacturing the same.

BACKGROUND ART

Recently, touch panels are employed in various electronic appliances to allow a user to input data by touching an image displayed on a display device using an input device, such as a finger or a stylus.

Such touch panels are mainly classified into resistive touch panels and capacitive touch panels. According to the resistive touch panel, an electrode is shorted as pressure is applied thereto from an input device so that a position is detected. According to the capacitive touch panel, capacitance between electrodes is varied as a finger touches the touch panel and a position is detected based on the capacitance variation.

The performance of the resistive touch panel may be degraded if the resistive touch panel is repeatedly used for a long time, and scratch may be generated. For this reason, the capacitive touch panel has been spotlighted due to the superior durability and long life span.

DISCLOSURE OF INVENTION

Technical Problem

The embodiment provides a touch panel capable of improving electric stability and touch sensitivity and a method for manufacturing the same.

Solution to Problem

A touch panel according to the embodiment includes a substrate; a first electrode formed on the substrate in a first direction and including a plurality of sensor parts and connection parts connecting the sensor parts with each other; and a second electrode formed in a second direction crossing the first direction while being insulated from the first electrode and including a plurality of sensor parts and connection parts connecting the sensor parts with each other, wherein the sensor parts and the connection parts include transparent conductive materials, and the connection parts have resistance lower than resistance of the sensor parts in at least one of the first and second electrodes.

A touch panel according to another embodiment includes a substrate; a first electrode formed on the substrate in a first direction and including a plurality of sensor parts and connection parts connecting the sensor parts with each other; and a second electrode formed in a second direction crossing the first direction while being insulated from the first electrode and including a plurality of sensor parts and connection parts connecting the sensor parts with each other, wherein the connection parts of at least one of the first and second electrodes include at least one selected from the group consisting of a carbon nano tube, a nano wire and a conductive polymer.

A method for manufacturing a touch panel according to the embodiment includes the steps of forming a plurality of first sensor parts and second sensor parts including transparent conductive materials on a substrate; forming first connection parts connecting the first sensor parts with each other by printing a transparent conductive composition on the substrate; forming an insulating layer including an insulating material on the first connection parts; and forming second connection parts connecting the second sensor parts with each other on the insulating layer by using the transparent conductive composition.

A method for manufacturing a touch panel according to another embodiment includes the steps of forming a plurality of first sensor parts, a plurality of second sensor parts and first connection parts connecting the first sensor parts with each other on a substrate by using a transparent conductive material; forming an insulating layer by printing an insulating material on the first connection parts; and forming second connection parts connecting the second sensor parts with each other on the insulating layer by using a transparent conductive composition.

Advantageous Effects of Invention

According to the touch panel of the embodiment, resistance of the connection part is lower than resistance of the sensor part, so that resistance of the first electrode and/or the second electrode is lowered, thereby improving the electric stability and touch sensitivity.

According to the touch panel of another embodiment, the connection part includes a nano wire or carbon nano tube, so superior optical and electric characteristics can be obtained. In detail, the transmittance and transparent degree of the touch panel can be improved while lowering resistance.

According to the method for manufacturing the touch panel of the embodiment, the connection part is formed through the printing process, so that the manufacturing process can be simplified. Since the connection part of the first electrode, the insulating layer and the connection part of the second electrode are sequentially formed through the printing process, the manufacturing process can be more simplified.

MODE FOR THE INVENTION

Figure 1:
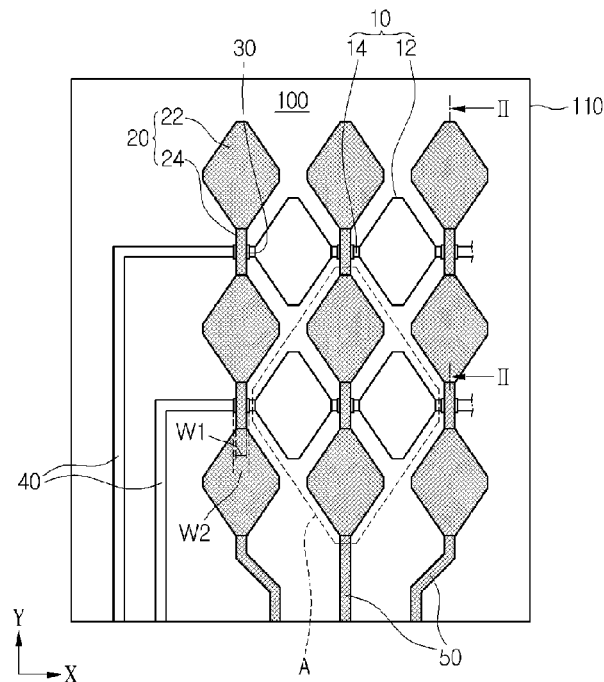
FIG. 1 is a plan view of a touch panel according to embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described in detail with reference to the accompanying drawings.

First, a touch panel according to the embodiment will be described in detail with reference to FIGS. 1 and 2.

Figure 2:
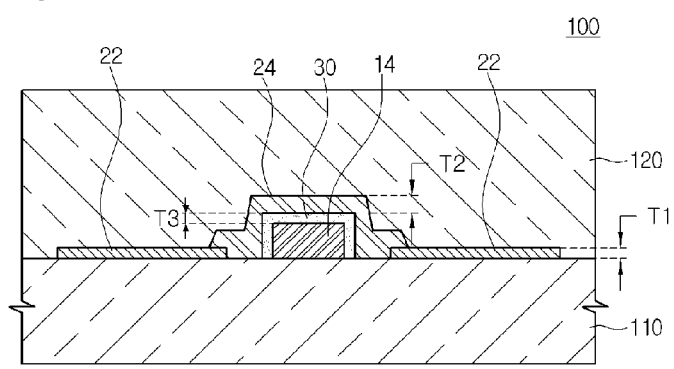
FIG. 2 is a sectional view taken along line II-II of FIG. 1.

FIG. 1 is a plan view of the touch panel according to embodiment and FIG. 2 is a sectional view taken along line II-II of FIG. 1.

Referring to FIG. 1, the touch panel 100 according to the embodiment includes a substrate 110, first and second electrodes 10 and 20 formed on the substrate 110, an insulating layer 30 formed at an intersection between the first and second electrodes 10 and 20 to insulate the first electrodes 10 from the second electrodes 20, and a protective member 120 for protecting the first and second electrodes 10 and 20 and the insulating layer 30.

The first electrodes 10 are drawn to the lower end of the substrate 110 by first wires 40 and the second electrodes 20 are drawn to the lower end of the substrate 110 by second wires 50. Terminal parts (not shown) can be formed on the first wires 40 or the second wires 50 and a flexible printed circuit board (FPCB) can be connected to the terminal parts such that the FPCB can be connected to an external circuit (not shown).

Although it has been described and illustrated that the first and second electrodes 10 and 20 are drawn to the lower end of the substrate 110, the embodiment is not limited thereto. The first electrodes 10 may be drawn in opposition to the second electrodes 20. Otherwise, the first electrodes 10 may be drawn to the lower end of the substrate 110 and the second electrodes 10 may be drawn to the left and right sides of the substrate 110. In addition, the first and second electrodes 10 and 20 may be drawn in various configurations such that the first and second electrodes 10 and 20 can be connected to the external circuit.

Hereinafter, the substrate 110, the first electrodes 10, the second electrodes 20, the insulating layer 30 and the first and second wires 40 and 50 will be described in detail.

The substrate 110 may include various materials capable of supporting the first electrodes 10, the second electrodes 10, the insulating layer 30 and the first and second wires 40 and 50 formed on the substrate 110. For instance, the substrate 110 may include a glass substrate.

The first electrodes 10 include a plurality of first sensor parts 12 for detecting whether an input device, such as a finger, makes contact with the first electrode 10 and first connection parts 14 for connecting the first sensor parts 12 with each other. The first connection parts 14 connect the first sensor parts 12 in the first direction (X-axis direction in the drawing), so that the first electrodes 10 extend in the first direction.

Similarly to the first electrodes 10, the second electrodes 20 include a plurality of second sensor parts 22 for detecting whether an input device, such as a finger, makes contact with the second electrode 20 and second connection parts 24 for connecting the second sensor parts 22 with each other. The second connection parts 24 connect the second sensor parts 22 in the second direction (Y-axis direction in the drawing) crossing the first direction so that the second electrodes 20 extend in the second direction.

The first and second sensor parts 12 and 22 and the first and second connection parts 14 and 24 may include transparent conductive materials such that electricity can be applied thereto without interfering with the transmission of the light. The transparent conductive materials may include various materials, such as indium tin oxide, indium zinc oxide, a carbon nano tube, a Ag nano wire and a conductive polymer.

According to the present embodiment, the first and second connection parts 14 and 24 have resistance lower than that of the first and second sensor parts 12 and 22. This is because the manufacturing process and manufacturing method for the first and second connection parts 14 and 24 are different from the manufacturing process and manufacturing method for the first and second sensor parts 14 and 24.

For instance, the first and second connection parts 14 and 24 may include materials having resistance lower than that of the first and second sensor parts 12 and 22 or the first and second connection parts 14 and 24 may have the thickness thicker than that of the first and second sensor parts 12 and 22 to lower the resistance of the first and second connection parts 14 and 24.

In the case that the first and second connection parts 14 and 24 include materials different from materials of the first and second sensor parts 12 and 22, the first and second sensor parts 12 and 22 exclusively include transparent conductive materials and inevitable impurities. In addition, the first and second connection parts 14 and 24 include at least one of a carbon nano tube (CNT), a nano wire and a conductive polymer as well as the transparent conductive materials. In addition, the first and second connection parts 14 and 24 may include conductive materials including at least one of the CNT, the nano wire and the conductive polymer. The resistance of the first and second connection parts 14 and 24 may be lowered due to the CNT, the nano wire and the conductive polymer.

Referring to FIG. 2, in the case that the thickness of the first and second connection parts 14 and 24 is different from the thickness of the first and second sensor parts 12 and 22, the thickness of the first and second connection parts 14 and 24 is thicker that the thickness of the first and second sensor parts 12 and 22, so that the resistance of the first and second connection parts 14 and 24 is lowered.

For instance, the thickness of the first and second connection parts 14 and 24 is thicker that the thickness of the first and second sensor parts 12 and 22 by 1.5 to 10 times. Although the thickness T2 of the second connection part 24 and the thickness T1 of the second sensor part 22 are shown in the drawing, the first connection part 14 and the first sensor part 12 may have the above thickness.

If the first and second connection parts 14 and 24 are thicker that the first and second sensor parts 12 and 22 less than 1.5 times, the resistance of the first and second connection parts 14 and 24 may not be sufficiently lowered. In addition, if the first and second connection parts 14 and 24 are thicker that the first and second sensor parts 12 and 22 more than 10 times, the thickness of the touch panel 100 may be increased and the amount of materials for manufacturing the first and second connection parts 14 and 14 may be increased, so that the manufacturing cost may rise. Thus, the thickness is set within the range of 1.5 to 10 times by taking the manufacturing cost into consideration.

Although it has been described and illustrated that the first and second connection parts 14 and 24 have the resistance different from the resistance of the first and second sensor parts 12 and 22, the embodiment is not limited thereto. It is also possible to allow only the first connection part 14 to have the resistance lower than that of the first sensor part 12 or to allow only the second connection part 24 to have the resistance lower than that of the second sensor part 22.

The insulation layer 30 is positioned at the intersection between the first and second connection parts 14 and 24 in order to prevent the electric short between the first and second connection parts 14 and 24. The insulating layer 30 may include a transparent insulating material capable of insulating the first connection part 14 from the second connection part 24. For instance, the insulating layer 30 may include metal oxide, such as silicon oxide or resin, such as acryl.

The first and second wires 40 and 50 may include various materials capable of transferring electricity to the first and second electrodes 10 and 20, respectively. The first and second wires 40 and 50 may include materials having superior electric conductivity, such as a metal.

The protective member 120 is aligned to cover the first and second electrodes 10 and 20, the insulating layer 30 and the first and second wires 40 and 50. The protective member 120 may include various materials capable of protecting the first and second electrodes 10 and 20, and the insulating layer 30, and the embodiment is not limited thereto.

If the input device, such as the finger, makes contact with the touch panel 100, capacitance difference may occur at a region that comes into contact with the input device, so this region is detected as the contact position.

In the case of the touch panel 100 having the above structure, the first and second connection parts 14 and 24 have the relatively low resistance, so the resistance of the first and second electrodes 10 and 20 can be lowered. Thus, the electric stability and the touch sensitivity of the touch panel 100 can be improved.

Hereinafter, the touch panel according to the second embodiment will be described with reference to FIG. 3. Description about the elements and structures that have been described in the first embodiment will be omitted in order to clarify and simplify the explanation.

Figure 3:
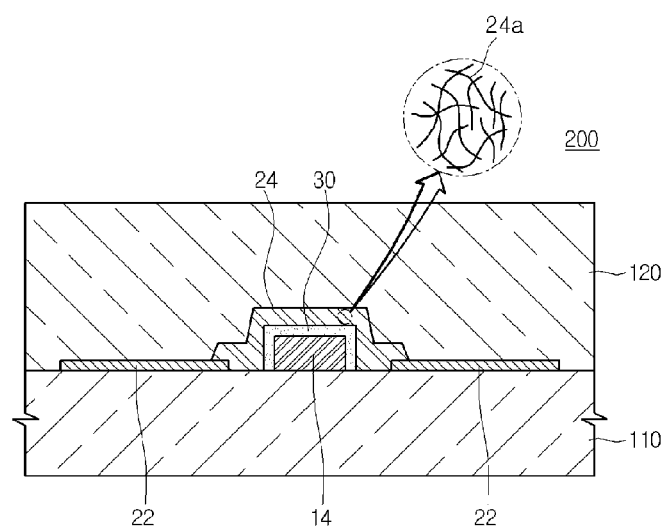
FIG. 3 is a sectional view of a touch panel according to the second embodiment.

FIG. 3 is a sectional view of the touch panel according to the second embodiment.

Referring to FIG. 3, the touch panel 200 according to the second embodiment includes a second connection part 24 having nano wires 24*a*. The nano wires 24*a* are connected to each other by a binder (not shown). Since the second connection part 24 includes the nano wires 24*a*, the second connection part 24 may have the superior optical and electric characteristics. In detail, the transparent degree and the transmission degree of the touch panel can be improved while lowering the resistance.

However, the embodiment is not limited to the above. For instance, the second connection part 24 may include carbon nano tubes connected to each other by the binder.

Hereinafter, the touch panel according to the third embodiment will be described with reference to FIG. 4.

Figure 4:
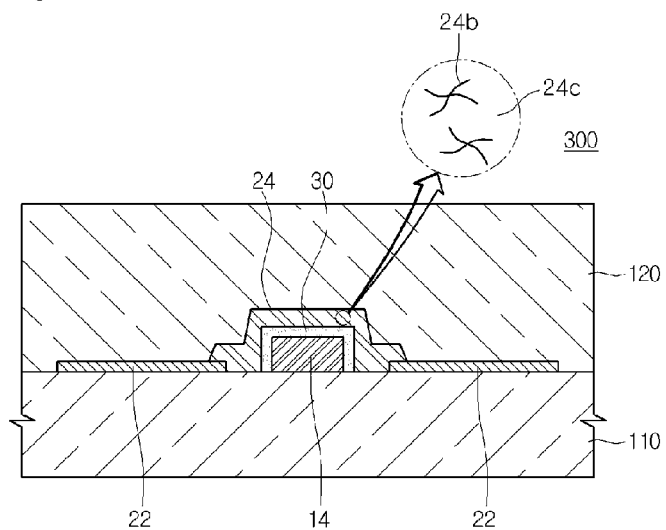
FIG. 4 is a sectional view of a touch panel according to the third embodiment.

FIG. 4 is a sectional view of the touch panel according to the second embodiment.

Referring to FIG. 4, the touch panel 300 according to the third embodiment includes a second connection part 24. The second connection part 24 may include at least one selected from the group consisting of a carbon nano tube, a nano wire, and a conductive polymer.

In detail, in the second connection part 24, the nano wires 24*b* are distributed in the conductive polymer 24*c*. However, the embodiment is not limited to the above. For instance, carbon nano tubes may be distributed in the conductive polymer instead of the nano wires.

Hereinafter, the method for manufacturing the touch panel according to the first embodiment will be described with reference to FIGS. 5 to 8.

FIGS. 5 to 8 are plan and sectional views for explaining the method for manufacturing the touch panel according to the first embodiment. In detail, FIGS. 5(*a*), 6(*a*), 7(*a*), and 8(*a*) are plan views showing the first electrode 10, the second electrode 20 and the insulating layer 30 formed in a region A of FIG. 1, and FIGS. 5(*b*), 6(*b*), 7(*b*), and 8(*b*) are sectional views taken along line B-B shown in FIGS. 5(*a*), 6(*a*), 7(*a*), and 8(*a*).

Figure 5:
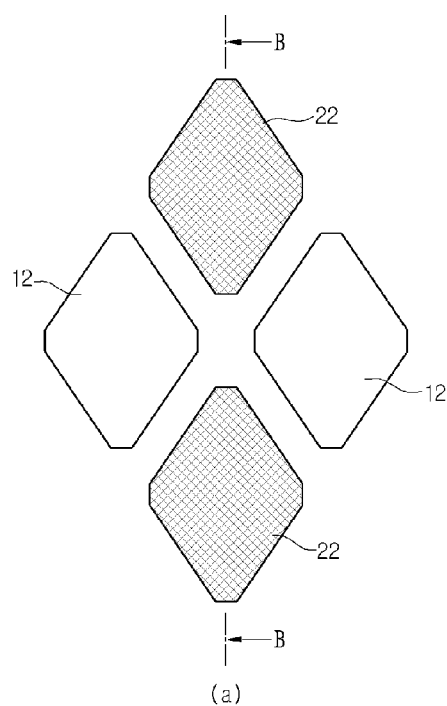
FIGS. 5 to 8 are plan and sectional views for explaining a method for manufacturing a touch panel according to the first embodiment.
Figure 5:
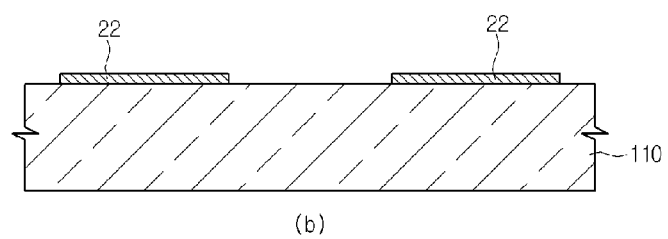

First, as shown in FIG. 5, a plurality of first sensor parts 12 and a plurality of second sensor parts 22 are formed on the substrate 110 by using the transparent conductive material. The transparent conductive material may include various materials, such as indium tin oxide or indium zinc oxide. The first and second sensor parts 12 and 22 can be formed by depositing the transparent conductive material, for example, through a vacuum deposition process.

Figure 6:
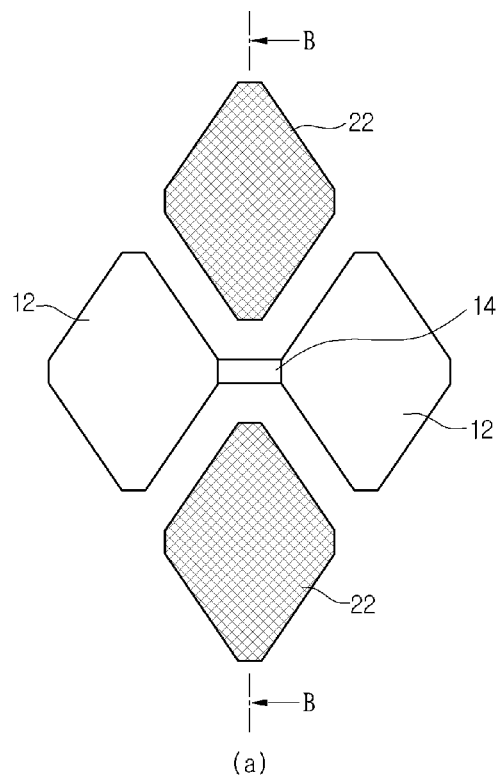
Figure 6:
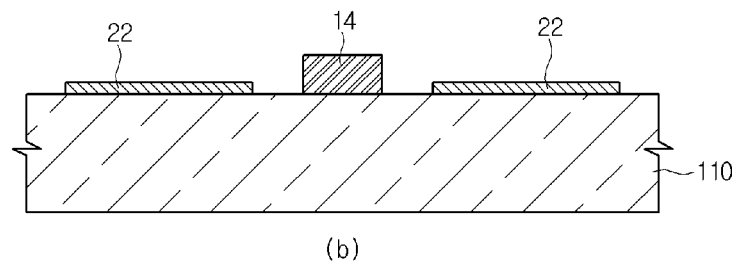

Then, as shown in FIG. 6, the first connection part 14 connecting the first sensor parts 12 with each other is formed by performing the printing process using a transparent conductive composition.

The transparent conductive composition may include ink that contains the transparent conductive material. The transparent conductive composition may include a transparent conductive material, a binder, a dispersing agent, and an additive. Various materials generally known in the art may be used as the binder, the dispersing agent and the additive.

Since the first connection part 14 is formed separately from the first sensor part 12, the first connection part 14 can be configured to have the resistance lower than that of the first sensor part 12. To this end, the first connection part 14 may have a thickness thicker than that of the first sensor part 12 or a carbon nano tube, a nano wire or a conductive polymer may be added to a material (that is, the transparent conductive composition) for the first connection part 14.

According to the related art, after depositing the transparent conductive material, the first connection part 14 is formed by patterning the transparent conductive material through the exposure/developing/etching processes, so the manufacturing process is complicated. However, according to the embodiment, the first connection part 14 is formed through the printing process, so the process for manufacturing the first connection part 14 can be simplified. In particular, the printing process is advantageous to form a thick layer, so the printing process is suitable for forming the first connection part 14 having the thickness thicker than the first sensor part 12.

Figure 7:
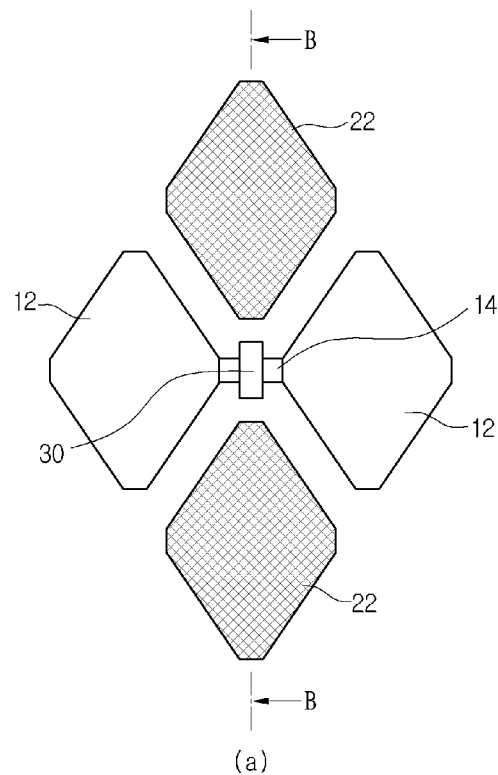
Figure 7:
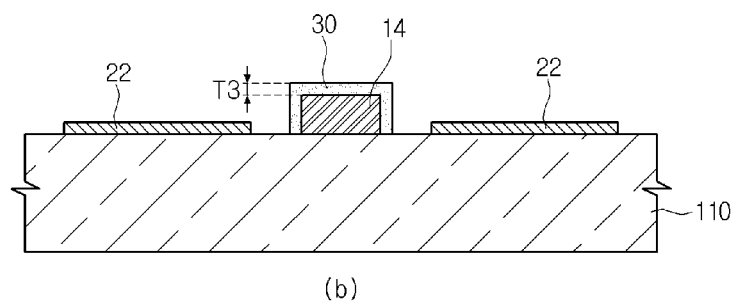

After that, as shown in FIG. 7, the insulating layer 30 including the insulating material is formed on the first connection part 14. The insulating layer 30 can be formed through the printing process by using resin. Since the insulating layer 30 is formed through the printing process by using the resin, the insulating resistance of the insulating layer 30 can be improved, so that the reliability of the touch panel 100 can be enhanced. For instance, the insulating layer 30 may have the resistance of about 60 GΩ.

The insulating layer 30 may have the thickness T3 of about 0.1 μm to about 100 μm. The thickness T3 of the insulating layer 30 may be changed by taking the printing characteristic of the second connection part 24 (see, FIG. 8) into consideration. If the thickness T3 of the insulating layer 30 is less than 0.1 μm, the insulating layer 30 may not sufficiently insulate the first connection part 14 from the second connection part 24. In addition, if the thickness T3 of the insulating layer 30 exceeds 100 μm, the thickness of the touch panel may be increased.

Figure 8:
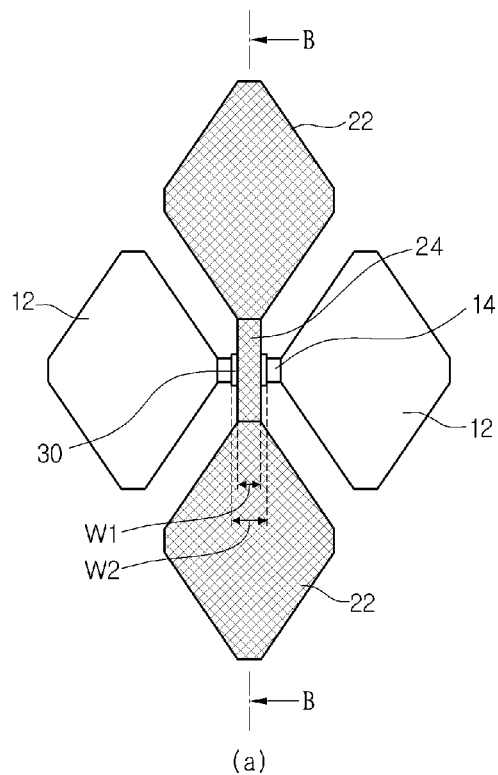
Figure 8:
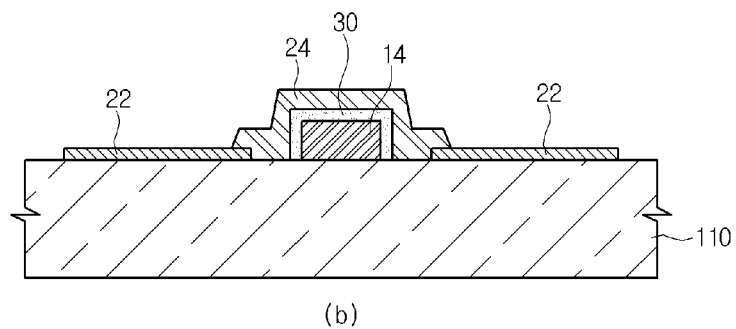

Then, as shown in FIG. 8, the second connection part 24 connecting the second sensor parts 22 with each other is formed on the insulating layer 30 by performing the printing process using the transparent conductive composition.

The transparent conductive composition may include ink that contains the transparent conductive material. The transparent conductive composition may include a transparent conductive material, a binder, a dispersing agent, and an additive. Various materials generally known in the art may be used as the binder, the dispersing agent and the additive.

For instance, the transparent conductive composition may be ink including a nano wire, a solvent and a binder. Such ink can be printed through the ink-jet scheme. According to the ink-jet scheme, the ink is sprayed from a slim nozzle. After the ink has been sprayed, the solvent is evaporated and the curing process is performed. The printing can be achieved by repeating the above processes.

Thus, the final materials constituting the second connection part 24 may be the nano wire and the binder. The touch panel 200 shown in FIG. 3 can be manufactured through the above printing process. At this time, the carbon nano tube may be used instead of the nano wire.

In addition, the transparent conductive composition may be a paste including a nano wire and a conductive polymer. In detail, the transparent conductive composition may be the paste including the nano wires distributed in the conductive polymer. The paste can be printed through the off-set printing scheme or the screen printing scheme. According to the off-set printing scheme, a paste is filled in an intaglio plate having a pattern and the primary transfer process is performed by using silicon rubber called a blanket. Then, the secondary transfer process is performed by closely attaching the blanket to the substrate formed with a conductive layer. According to the screen printing scheme, the paste is formed on the screen having the pattern and then the paste is pressed by a squeeze, so that the paste is directly printed onto the substrate having the conductive layer through the screen having space sections.

Therefore, the second connection part may include the nano wires distributed in the conductive polymer. The touch panel 300 shown in FIG. 4 can be manufactured through the above printing process. At this time, the carbon nano tube may be used instead of the nano wire.

However, the embodiment is not limited to the above, and the second connection part 24 can be formed through various printing schemes.

Since the second connection part 24 is formed separately from the second sensor part 22, the second connection part 24 can be configured to have the resistance lower than that of the second sensor part 22. To this end, the second connection part 24 may have a thickness thicker than that of the second sensor part 22 or a carbon nano tube, a nano wire or a conductive polymer may be added to a material (that is, the transparent conductive composition) for the second connection part 24.

According to the related art, after depositing the transparent conductive material, the second connection part 24 is formed by patterning the transparent conductive material, so the manufacturing process is complicated. However, according to the embodiment, the second connection part 24 is formed through the printing process, so the process for manufacturing the second connection part 24 can be simplified. In particular, the printing process is advantageous to form a thick layer, so the printing process is suitable for forming the second connection part 24 having the thickness thicker than the second sensor part 22.

A width W1 of the second connection part 24 may be narrower than a width W2 of the insulating layer 30. In detail, the width W1 of the second connection part 24 may be 1% to 99% based on the width W2 of the insulating layer 30. Thus, the electric short can be prevented between the first and second connection parts 14 and 24.

After that, the protective member 120 is formed, thereby manufacturing the touch panel shown in FIG. 2.

According to the present embodiment, the first connection part 14, the insulating layer 30, and the second connection part 24 can be sequentially formed through the printing process, so that the touch panel can be easily manufactured.

Hereinafter, the method for manufacturing the touch panel according to the second embodiment will be described with reference to FIGS. 9 to 11.

Figure 9:
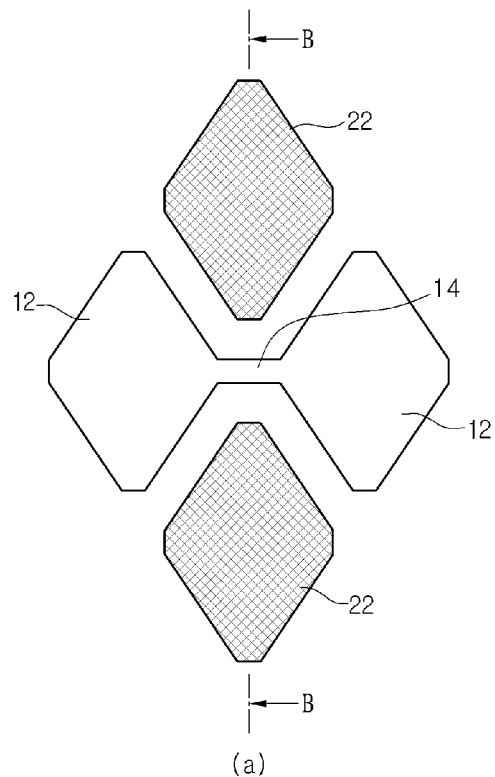
FIGS. 9 to 11 are plan and sectional views for explaining a method for manufacturing a touch panel according to the second embodiment.
Figure 9:
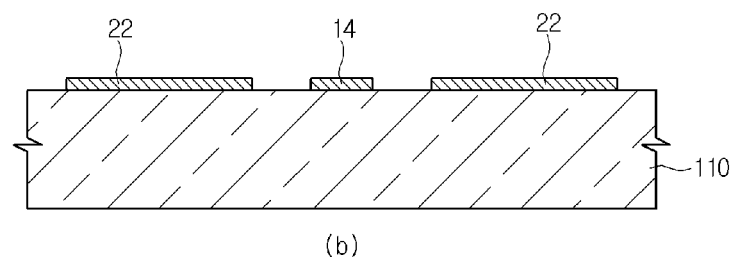
Figure 10:
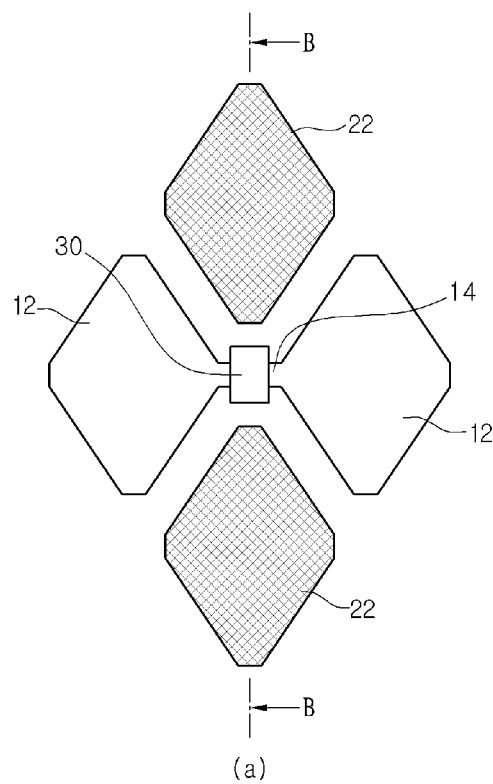
Figure 10:
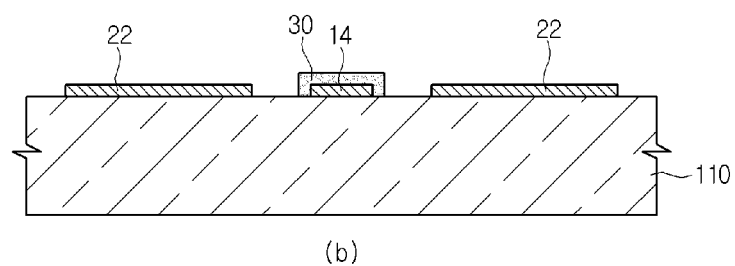
Figure 11:
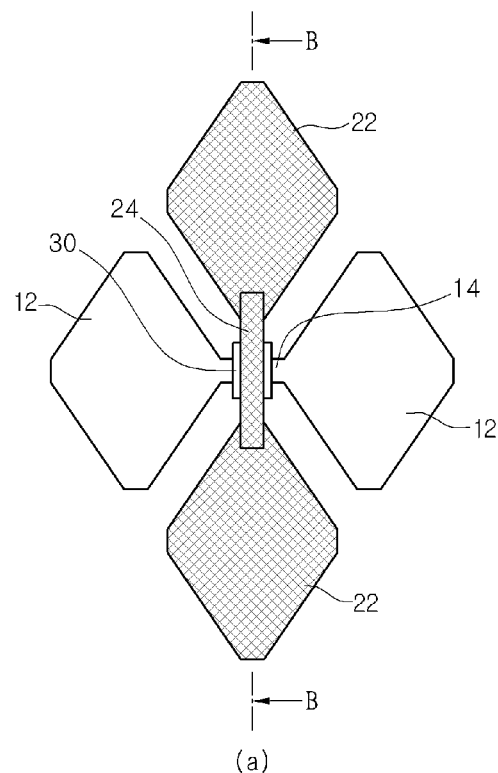
Figure 11:
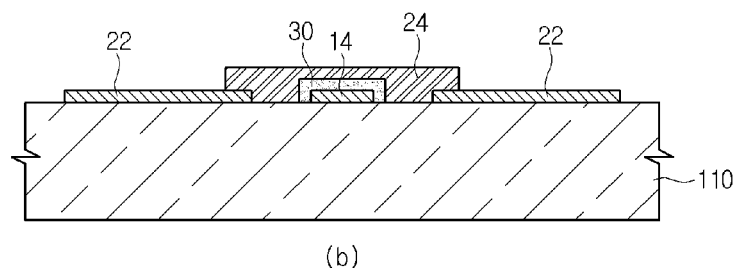

FIGS. 9 to 11 are plan and sectional views for explaining the method for manufacturing the touch panel according to the second embodiment.

First, as shown in FIG. 9, a plurality of first sensor parts 12, a first connection part 14 connecting the first sensor parts 12 with each other, and a plurality of second sensor parts 22 are formed on the substrate 110. That is, the first connection part 14 is prepared as a pattern connected between the first sensor parts 12 without separately forming the first connection part 14, so that the manufacturing steps and the manufacturing time can be reduced.

Then, as shown in FIG. 10, the insulating layer 30 is formed on the first connection part 14.

After that, as shown in FIG. 11, a second connection part 24 connecting the second sensor parts 22 with each other is formed on the insulating layer.

The invention claimed is:

1. A touch panel comprising:
   a substrate;
   a first electrode formed on the substrate in a first direction and including a plurality of first sensor parts and first connection parts connecting the first sensor parts with each other;
   an insulating layer formed on the first connection parts of the first electrode; and
   a second electrode formed in a second direction crossing the first direction while being insulated from the first electrode by the insulating layer and including a plurality of second sensor parts and second connection parts connecting the second sensor parts with each other;
   wherein the first and second sensor parts and the first and second connection parts include transparent conductive materials,
   wherein each first connection part is thicker than each first sensor part and each second connection part is thicker than each second sensor part,
   wherein the first and second electrodes are disposed on a same surface of the substrate,
   wherein the insulating layer has a thickness in a range of 0.1 μm to 100 μm,
   wherein the insulating layer is spaced apart from the plurality of sensor parts of the first electrode and the plurality of sensor parts of the second electrode, and
   wherein each connection part is in direct contact with sensor parts of the plurality of sensor parts.

2. The touch panel of claim 1, wherein the first and second connection parts of at least one of the first and second electrodes include at least one selected from the group consisting of a carbon nano tube, a nano wire and a conductive polymer.

3. The touch panel of claim 1, wherein the first connection parts are thicker than the first sensor parts by 1.5 to 10 times, the second connection parts are thicker than the second sensor parts by 1.5 to 10 times, or both.

4. The touch panel of claim 1, wherein the first and second sensor parts include at least one selected from the group consisting of an indium tin oxide, an indium zinc oxide, a carbon nano tube, a Ag nano wire and a conductive polymer.

5. A touch panel comprising:
a substrate;
a first electrode formed on the substrate in a first direction and including a plurality of first sensor parts and first connection parts connecting the first sensor parts with each other;
an insulating layer formed on the first connection parts of the first electrode; and
a second electrode formed in a second direction crossing the first direction while being insulated from the first electrode by the insulating layer and including a plurality of second sensor parts and second connection parts connecting the second sensor parts with each other;
wherein each first connection part is thicker than each first sensor part and each second connection part is thicker than each second sensor part,
wherein the first and second electrodes are disposed on a same surface of the substrate,
wherein the insulating layer has a thickness in a range of 0.1 µm to 100 µm,
wherein the insulating layer is spaced apart from the plurality of sensor parts of the first electrode and the plurality of sensor parts of the second electrode, and
wherein each connection part is in direct contact with sensor parts of the plurality of sensor parts.

6. The touch panel of claim 5, wherein the first and second connection parts include a carbon nanotube or a nanowire distributed in a conductive polymer.

7. A method for manufacturing a touch panel, the method comprising:
forming a plurality of first sensor parts and second sensor parts including transparent conductive materials on a substrate;
forming first connection parts connecting the first sensor parts with each other by printing a transparent conductive composition on the substrate;
forming an insulating layer including an insulating material on the first connection parts; and
forming second connection parts connecting the second sensor parts with each other on the insulating layer by using the transparent conductive composition;
wherein each first connection part is thicker than each first sensor part and each second connection part is thicker than each second sensor part,
wherein first and second electrodes are disposed on a same surface of the substrate,
wherein the insulating layer has a thickness in a range of 0.1 µm to 100 µm,
wherein the insulating layer is spaced apart from the plurality of sensor parts of the first electrode and the plurality of sensor parts of the second electrode,
wherein each first connection part is in direct contact with first sensor parts of the plurality of first sensor parts, and
wherein each second connection part is in direct contact with second sensor parts of the plurality of second sensor parts.

8. The method of claim 7, wherein the forming of the insulating layer comprises printing the insulating material.

9. The method of claim 7, wherein the forming of the second connection parts comprises printing the transparent conductive composition.

10. The method of claim 7, wherein a width of the second connection parts is 1% to 99% based on a width of the insulating layer.

11. The method of claim 7, wherein resistance of the connection parts is lower than resistance of the sensor parts in at least one of the first and second electrodes.

12. The method of claim 11, wherein the connection parts of at least one of the first and second electrodes include at least one selected from the group consisting of a carbon nano tube, a nano wire and a conductive polymer.

13. A method for manufacturing a touch panel, the method comprising:
forming a plurality of first sensor parts, a plurality of second sensor parts and first connection parts connecting the first sensor parts with each other on a substrate by using a transparent conductive material;
forming an insulating layer by printing an insulating material on the first connection parts, wherein the insulating layer has a thickness in a range of 0.1 µm to 100 µm; and
forming second connection parts connecting the second sensor parts with each other on the insulating layer by using a transparent conductive composition;
wherein each first connection part is thicker than each first sensor part and each second connection part is thicker than each second sensor part,
wherein first and second electrodes are disposed on a same surface of the substrate,
wherein the insulating layer has a thickness in a range of 0.1 µm to 100 µm,
wherein the insulating layer is spaced apart from the plurality of sensor parts of the first electrode and the plurality of sensor parts of the second electrode,
wherein each first connection part is in direct contact with first sensor parts of the plurality of first sensor parts, and
wherein each second connection part is in direct contact with second sensor parts of the plurality of second sensor parts.

14. The method of claim 13, wherein the forming of the second connection parts comprises printing the transparent conductive composition.

* * * * *